United States Patent
Matsuo et al.

(10) Patent No.: US 6,333,901 B1
(45) Date of Patent: Dec. 25, 2001

(54) DISC REPRODUCING APPARATUS FOR DETERMINING A TRACK JUMP

(75) Inventors: Kazunori Matsuo; Yasutaka Suzuki; Masakazu Takahashi; Yoshimichi Nishio; Hideaki Watarihana; Hiroki Goto; Teruo Takahashi; Kiyoshi Furukawa; Hiroyuki Kobayashi; Hidetsugu Kubota; Takuya Abe, all of Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/426,200

(22) Filed: Oct. 25, 1999

(30) Foreign Application Priority Data

Oct. 29, 1998 (JP) ................................. 10-308264

(51) Int. Cl.[7] ................................. G11B 17/22
(52) U.S. Cl. ................................. 369/33; 369/32
(58) Field of Search ................. 369/32, 33, 44.28, 369/44.27, 44.26, 44.29, 44.35

(56) References Cited

U.S. PATENT DOCUMENTS

| 5,148,417 | * | 9/1992 | Wong et al. | 369/32 |
| 5,365,502 | * | 11/1994 | Misono | 369/18 |
| 5,410,525 | * | 4/1995 | Yokota | 369/32 |
| 5,471,442 | * | 11/1995 | Shimizume | 369/32 |
| 5,508,983 | * | 4/1996 | Nakamura et al. | 369/32 |
| 5,799,197 | * | 8/1998 | Juso et al. | 713/323 |
| 5,818,801 | * | 10/1998 | Watanabe et al. | 369/33 |
| 5,831,946 | * | 11/1998 | Bie | 369/33 |
| 6,111,826 | * | 8/2000 | Minase | 369/33 |

* cited by examiner

*Primary Examiner*—Tan Dinh
(74) *Attorney, Agent, or Firm*—Arent Fox Kintner Plotkin & Kahn, PLLC (57) ABSTRACT

A disc reproducing apparatus is provided which is adapted to scan information tracks to read information recorded on an information recording medium. This disc reproducing apparatus comprises: determining means capable of determining an actually happened track jump, said determining being effected when a difference between a present reproducing positional information and a reference reproducing positional information is larger than a predetermined value; detecting means for detecting a present track position which is just being reproduced at a present time; and setting means for setting said predetermined value corresponding to the present track position, in accordance with a result of the detecting means.

11 Claims, 7 Drawing Sheets

| PRESENT TIME DATA A | REFERENCE DATA $C_i$ |
|---|---|
| 0~10 MINUTES | $C_1$=TIME CORRESPONDING TO 9 BLOCKS |
| 10~17 MINUTES | $C_2$=TIME CORRESPONDING TO 10 BLOCKS |
| 17~27 MINUTES | $C_3$=TIME CORRESPONDING TO 12 BLOCKS |
| 27~40 MINUTES | $C_4$=TIME CORRESPONDING TO 14 BLOCKS |
| 40~57 MINUTES | $C_5$=TIME CORRESPONDING TO 16 BLOCKS |
| 57~70 MINUTES | $C_6$=TIME CORRESPONDING TO 18 BLOCKS |
| 70 MINUTES OR MORE | $C_7$=TIME CORRESPONDING TO 19 BLOCKS |

DISC REPRODUCING APPARATUS FOR DETERMINING A TRACK JUMP

BACKGROUND OF THE INVENTION

The present invention relates to a disc reproducing apparatus for reproducing information recorded on a CD (Compact Disc), a DVD (Digital Video Disc or Digital Versatile Disc).

Usually, in order to ensure a conformability between a recording medium such as CD or DVD (hereinafter simply referred to as disc) and a disc reproducing apparatus, data is recorded on a disc in accordance with a predetermined data format, while recorded data is reproduced by performing an encoding treatment in accordance with the above data format.

Figure 5:
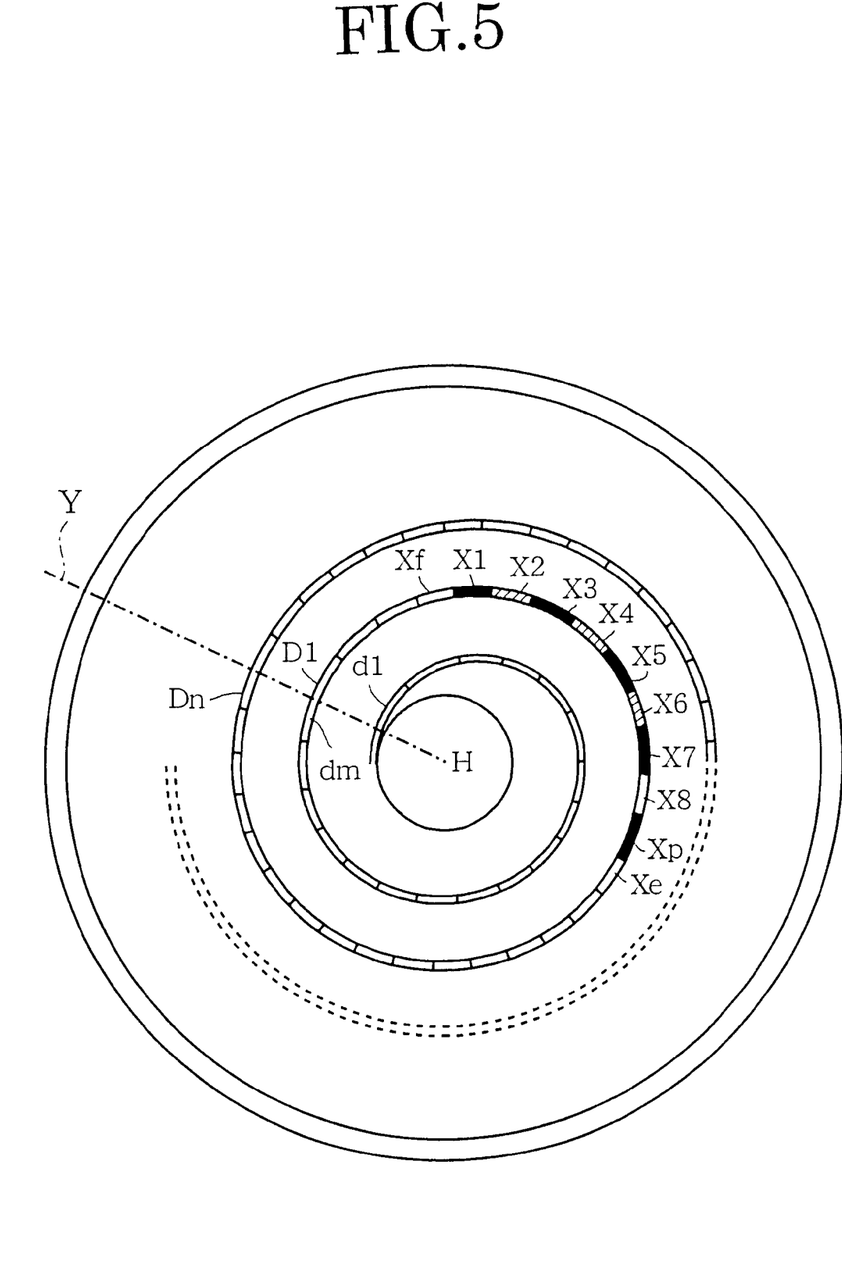
FIG. 5 is an explanatory view schematically indicating the structure of circular disc-like recording medium.
Figure 6:
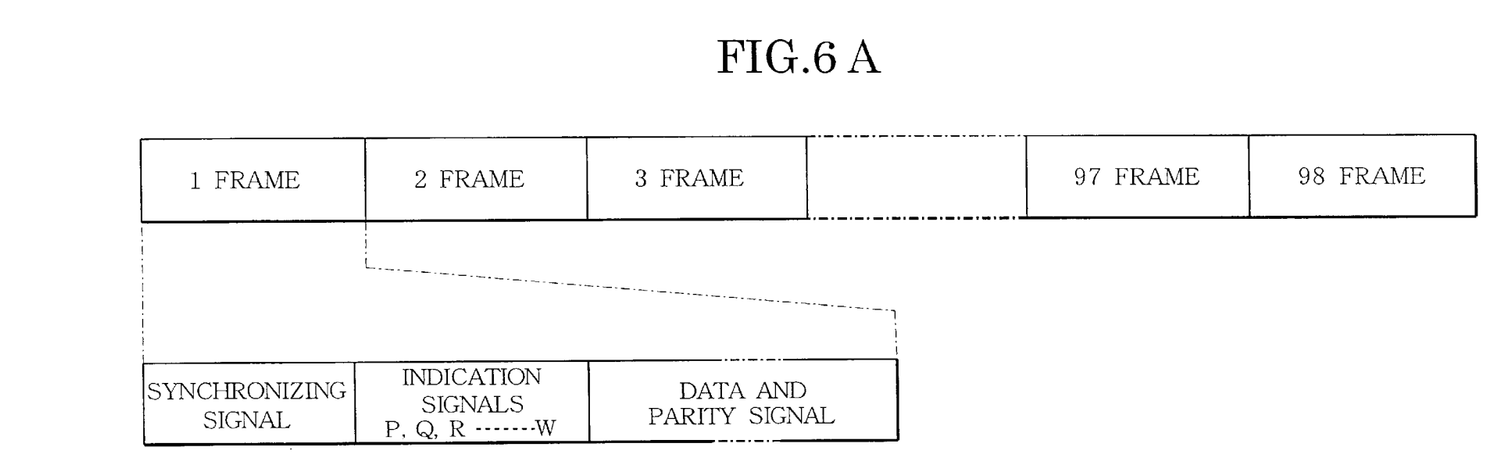
FIGS. 6A and 6B are used to indicate the constitution of data of a recording medium and the constitution of sub-code Q signals.

For example, as shown in FIG. 5, with regard to a CD, information data is recorded along one spiral-like information track arranged in a program area between a lead-in position and a lead-out position. Further, as shown in FIG. 6A, other data than musical information is recorded in 98 frames forming one block unit. In fact, each frame includes synchronizing signal, indication signal, parity signal and information data.

Further, as shown in FIG. 6A, the indication signal includes P, Q, R, S, T, U, V and W signals each consisting of one bit, and these signals are divided into 8 sub-coding channels. In this way, as shown in FIG. 6B, by virtue of the Q signals included in 98 frames, it is allowed to obtain sub-code Q signals indicating address information (time information) recorded in each block, and synchronizing signals (sub-coding synchronism) S0, S1.

In order to correctly read data recorded on a disc, it is necessary to perform a tracking control of an optical pickup, and to determine whether the address information (time information) is being continuously obtained in accordance with the sub-code Q signals.

When the address information (time information) is being continuously obtained, it is determined that the optical pickup is properly tracing an information track and that data recorded on the disc is being exactly read out, thereby permitting the information reading process to be continued.

On the other hand, if the address information (time information) being continuously obtained has suddenly jumped, it is determined that the optical pickup has deviated to an adjacent information track because of an external vibration or due to some other reasons. At this moment, a block of the track where the optical pickup had arrived immediately before the pickup deviation occurred will be searched, so that the information reading process will be continued from the searched position, thereby effecting a necessary compensation treatment to ensure that the recorded data may be read out completely.

Figure 7:
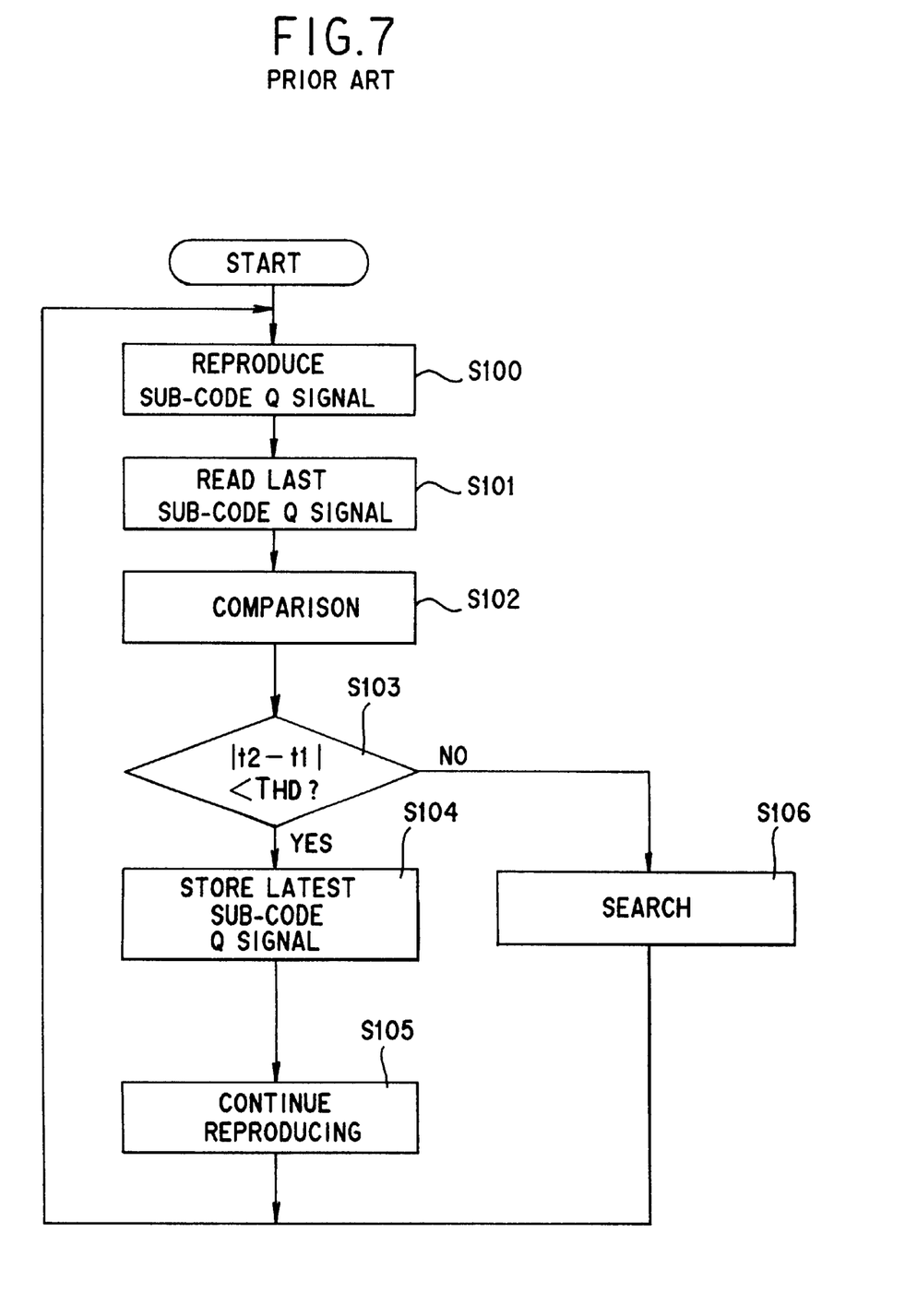
FIG. 7 is a flowchart indicating an example of an operation for performing a compensation treatment according to a prior art.

FIG. 7 is a flowchart indicating an example of a compensation treatment according to a prior art. As shown in FIG. 7, when an optical pickup is operated to start its scanning operation, sub-code Q signals will be reproduced from the indication signals of one block (98 frames) at a step S100. Then, at a step S101, a sub-code signal Q reproduced during the last operation is read out from a memory. At a step S102, address information (time information) t1 contained in the last time sub-code signal Q is compared with address information contained in the latest sub-code signal Q so as to obtain a time difference $|t2-t1|$. At a step S103, it is determined whether the time difference $|t2-t2|$ has continued for over a predetermined time T HD.

If $|t2-t1|<T HD$, it is determined that the optical pickup is tracing an information track in a correct manner, so that the obtained latest sub-code signal Q is written and stored in the above memory (step S104), thus allowing the normal reproducing operation to be continued at a step S105, thereby repeating the same process beginning from the step S100.

On the other hand, if it is determined at the step S103 that $|t2-t1| \geq T HD$, it may be determined that the optical pickup has jumped (deviated) from one information track to an adjacent track. Then, at a step 106, in accordance with address information t1 of the sub-code signal Q formerly read out from the memory, a block of the track at which the pickup had arrived immediately before the pickup deviation occurred will be searched, so that the information reading process will be continued from the searched position, thereby effecting a compensation treatment to ensure that the recorded data may be read out completely.

However, with the compensation treatment carried out in the above conventional disc reproducing apparatus, there is a problem that although the optical pickup has in fact not jumped (deviated) to an adjacent information track, a mistaken determination will sometimes happen indicating that such a jump (deviation) of the optical pickup has occurred.

Here, a mistaken determination associated with the prior art will be explained in the following with reference to FIG. 5.

Referring to FIG. 5, a virtual line Y has been drawn extending from the center of a CD in the radial direction thereof. As may be understood in FIG. 5, there are fewer blocks toward the inner lead side and there are more blocks toward the outer lead side. For example, the inmost track contains blocks arranging from a first block d1 to a No. m block dm, while an outer track contains blocks arranging from a block D1 to a No. n block Dn, with m being smaller than n, i.e., n>m.

Conventionally, to detect an occurrence of a jump (or deviation) of an optical pickup (hereinafter may be referred to as track jump), the above predetermined time T HD is set to be shorter than a time necessary for scanning (at a predetermined linear speed) blocks d1–dm on the inmost track. In other words, a time necessary for scanning (at a predetermined linear speed) blocks fewer than blocks d1–dm on the inmost track is set to be the predetermined time T HD.

In this way, when an optical pickup jumps from the inmost track to an adjacent track, almost m blocks fail to be scanned. Thus, at the step 103 of FIG. 7, it is allowed to detect whether there is a jump (or deviation) of the optical pickup by comparing a time difference (between a sub-code signal Q of a block immediately before the jump and a sub-code signal Q of a block immediately after the jump) with the above predetermined time T HD.

If a track jump happens when the optical pickup is scanning a track on an outer lead side, the blocks failing to be scanned will be more than those on an inner track. Therefore, it is possible to determine whether there is a track jump at the step S103 shown in FIG. 7.

However, if a lot of defect blocks are continuously existing on a track on the outer lead side, and if the defect blocks are more than the blocks corresponding to the predetermined fixed time T HD, a mistaken determination indicating a track jump will happen regardless of a fact that there is no track jump at all.

For example, when there are blocks D1–Dn existing on the track adjacent to the outer lead side, and blocks X1–Xp among the blocks D1–Dn are defect blocks, it is impossible to correctly read sub-code signal Q from the blocks X1–Xp.

A time difference between a sub-code signal Q of block Xf (which is immediately before a block X1) and another sub-code signal Q of Xe (which is immediately after a block Xp), will become clearly larger than the above predetermined fixed time T HD. As a result, at the step S103 (FIG. 7) there will be a mistaken determination indicating that a track jump has occurred, causing re-start of information reading from a block Xf, regardless of the fact that there is no track jump at all.

Further, even if the information reading is re-started from the block Xf, since the blocks X1–Xp are defect blocks, there will again be a mistaken determination indicating that there has occurred a track jump. In this manner, a scanning treatment for information reading will be repeated again and again from block Xf to block Xe, resulting in a problem that it will become impossible to perform a desired normal reading of information from the block Xe onward.

Further, as to why there will occur defect blocks, a possible reason may be considered to be a wound formed or a dust attached on the optical disc. Alternatively, a reason responsible for a defect block may be that the disc itself as a whole is defect which is often a problem resulting from the disc manufacturing process.

In addition, as to why there will be a mistaken determination, some other reasons may be a deviation in focusing control and a deviation in tracking control of an optical pickup, a jitter caused due to disc skew, or an aging phenomenon of an optical pickup.

SUMMARY OF THE INVENTION

It is an object of the present invention to provide an improved disc reproducing apparatus which during a scanning process for information reading will not cause mistaken determination indicating a non-existing track jump, and which will produce a correct determination indicating a true (actually occurred) track jump, so as to solve the above-mentioned problems peculiar to the above-discussed prior arts.

According to the present invention, there is provided a disc reproducing apparatus adapted to scan information tracks to read information recorded on an information recording medium, said disc reproducing apparatus comprising: determining means capable of determining an actually happened track jump, said determining being effected when a difference between a present reproducing positional information and a reference reproducing positional information is larger than a predetermined value; detecting means for detecting a present track position which is just being reproduced at a present time; and setting means for setting said predetermined value corresponding to the present track position, in accordance with a result of the detecting means.

In one aspect of the present invention, the larger the information amount contained in a track which is scanned, the larger the said predetermined value is set to be.

In another aspect of the present invention, once the determining means determines that a track jump has happened, a normal scanning reading operation is re-started from a track position corresponding to the reference reproducing positional information.

The above objects and features of the present invention will become better understood from the following description with reference to the accompanying drawings.

DETAILED DESCRIPTION OF THE PREFERRED EMBODIMENTS

Figure 1:
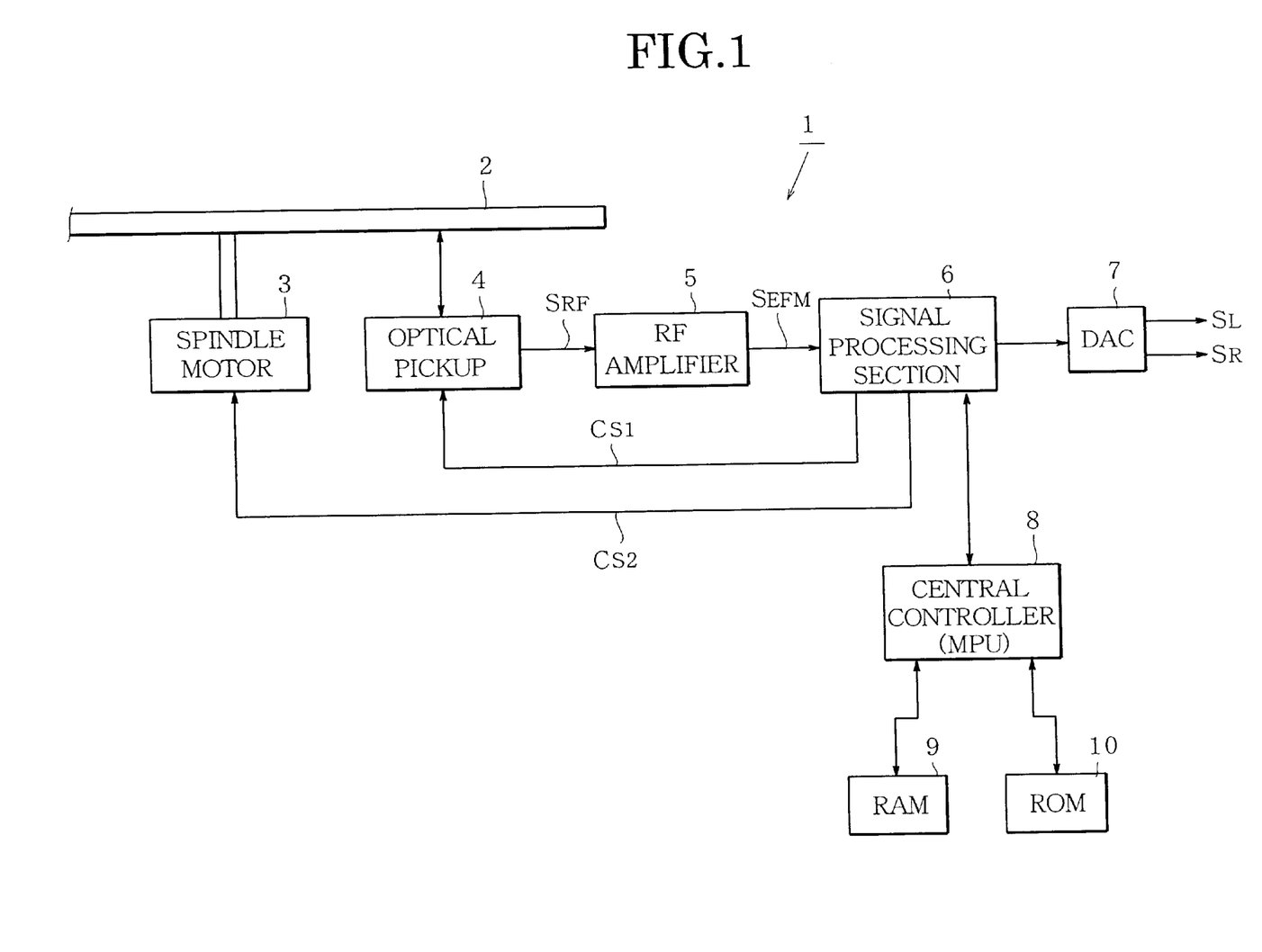
FIG. 1 is a block diagram indicating the constitution of a disc reproducing apparatus made according to the present invention.

FIG. 1 is a block diagram indicating some important portions of a disc reproducing apparatus 1 formed according to the present invention.

Referring to FIG. 1, the reproducing apparatus 1 comprises a spindle motor 3 for rotating a disc 2 at a predetermined linear speed, an optical pickup 4 for optically reading information recorded on the disc 2. The optical pickup 4 contains a photo-detector capable of converting the information read from the disc 2 into RF signal $S_{RF}$. The RF signal $S_{RF}$ is amplified by an RF amplifier 5 so as to obtain an amplitude capable of being treated in a signal processing treatment, followed by being treated in a waveform trimming treatment, so as to be outputted as an EFM signal $S_{EFM}$.

A signal processing section 6 containing a data demodulator and a servo controller, by decoding the EFM signal $S_{EFM}$, can produce a synchronizing signal and a sub-code signal and can also produce audio signal scheduled to be reproduced. Further, by supplying the audio signal to a D/A converter 7, it is allowed to produce an analogue audio signals $S_L$, $S_R$. Moreover, in accordance with the above synchronizing signal and sub-code signal, the signal processing section 6 can produce various servo signals CS1 and CS2 for servo controlling the spindle motor 3 and the optical pickup 4.

Further, there is provided a central controller 8 containing a MPU (Micro Processing Unit) for controlling the entire operation of the disc reproducing apparatus 1. The central controller 8 is connected to a RAM (Random Access Memory) 9 for use in a compensation treatment which will be related later. The central controller 8 is also connected to a ROM (Read Only Memory) 10 which has stored a plurality of reference data Ci for use in the compensation treatment.

The operation for determining (detecting) a track jump in the above disc reproducing apparatus 1 having the above-described constitution will be described in the following with reference to a flow chart shown in FIG. 2.

Figure 2:
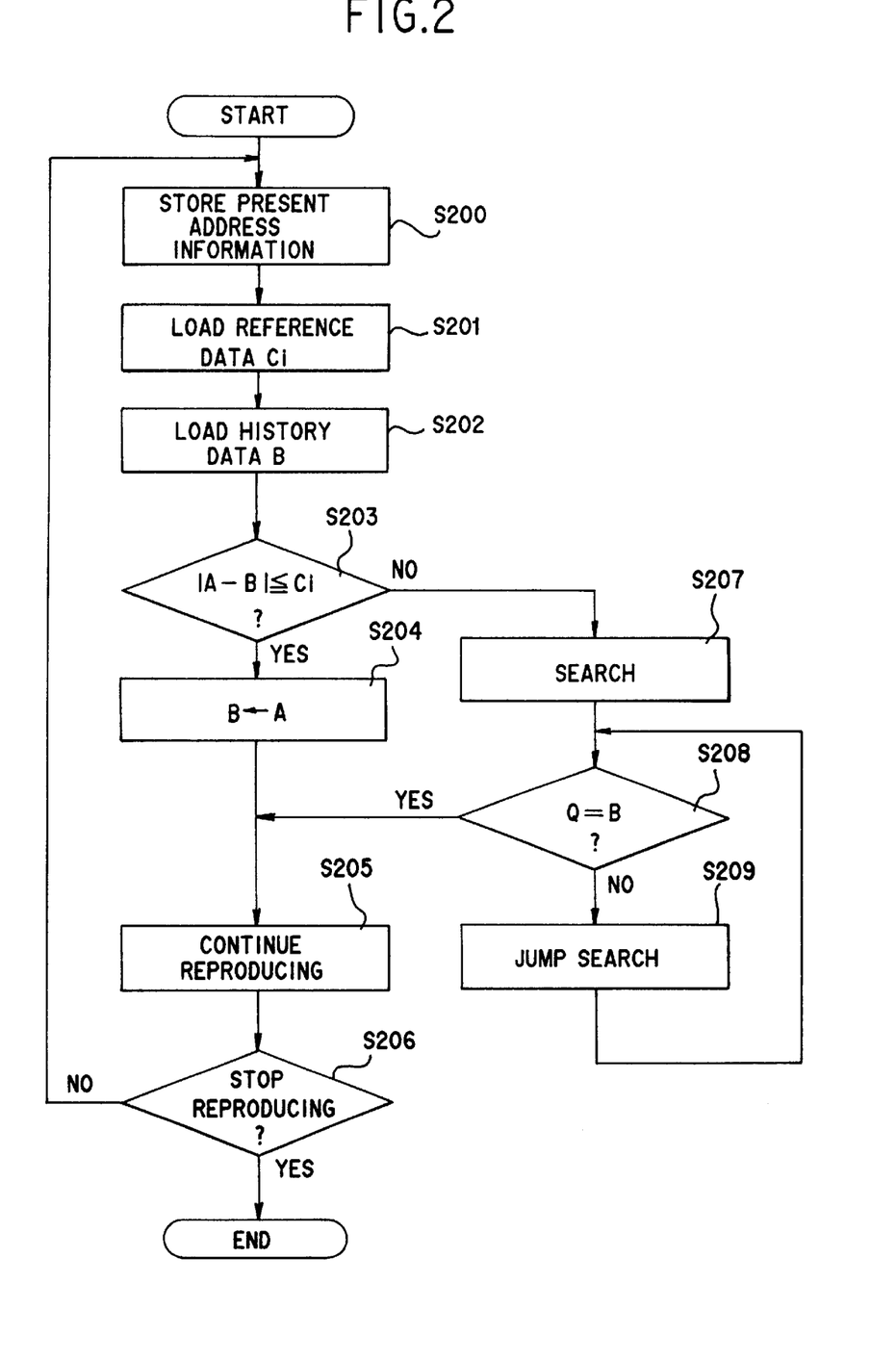
FIG. 2 is a flowchart indicating a determining process for determining a track jump.

Referring to FIG. 2, once a user gives a disc reproducing command to the central controller 8, the spindle motor 3 starts to rotate in a predetermined linear speed, so that an information reading operation will be started by virtue of the optical pickup 4.

At a step S200, the signal processing section 6 is operated to produce a present sub-code signal Q, in accordance with the EFM signal $S_{EFM}$ (of one block unit) obtained by the information reading operation. A present address information (time information) contained in the sub-code signal Q, is stored in a first resister of the central controller 8 (i.e., with present reproducing positional information serving as present time data).

At a step S201, the central controller 8 operates to get access to the ROM 10 in accordance with the present time data A, so as to load the reference data Ci stored in the access address of ROM 10 into a second resister of the MPU.

Figure 3:
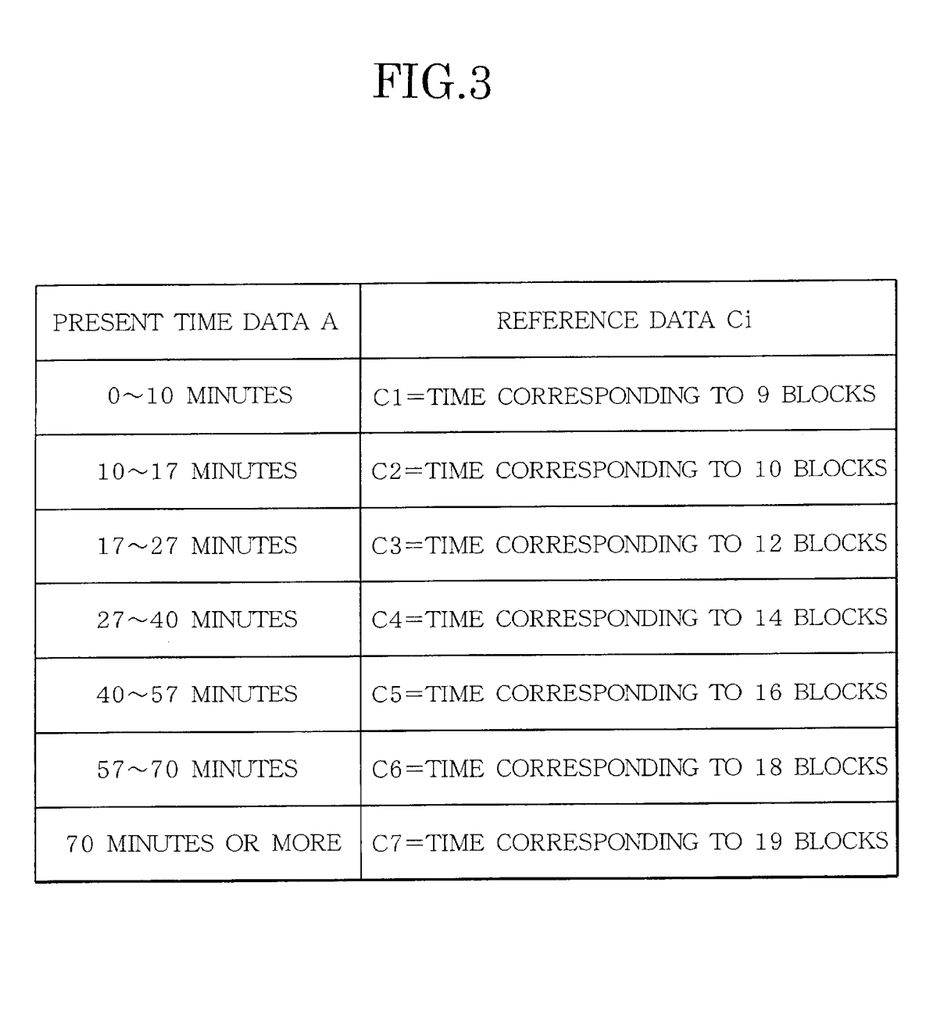
FIG. 3 is an explanatory view indicating a memory map of a memory which has stored a plurality of reference data.

As indicated in a memory map shown in FIG. 3, a plurality of reference data C1–C7 having different values are stored in a plurality of time ranges predetermined in ROM 10. In this way, when the central controller 8 gets access to the ROM 10 in accordance with a present time data A, a reference data Ci of a time range corresponding to the present time data will be loaded into the second resister of the MPU.

Then, at a step S202, the central controller 8 gets access to RAM 9, data B (history time data) indicating an address information of the sub-code signal Q reproduced at the last time will be loaded into a third resister.

Subsequently, at a step 203, the central controller 8 operates to calculate an absolute value |A−B| which is a difference between a present time data A of the first resister and a history time data B of the third resister, and execute a comparison between the absolute value |A−B| and a value of a reference data Ci of the second resister. Namely, it is allowed to calculate a time difference between a history time data B representing a reference reproduction positional information and a present time data A representing a present reproduction positional information, thereby obtaining an absolute value |A−B|.

Afterwards, if |A−B|≦Ci, it is allowed to determine that there is no track jump, so that a series of processes from the step S200 are repeated, followed by a series of subsequent steps 204–206 (which will be described in detail later). On the other hand, if |A−B|>Ci, it is allowed to determine that there has happened a track jump, so that several operations at steps S207–S209 are executed for effecting a compensation treatment.

Further, if it is determined at the step S203 that |A−B|≦Ci, the present time data A will be stored in the RAM 9, so that the present time data A is used as a history time data B to replace a former history data (step S204). Meanwhile, the normal reproducing operation is continued (a step S205), and if a user has not given a command for stopping the reproducing operation (step 206), the normal process from the step S200 will again be repeated.

On the other hand, if it is determined at the step S203 that |A−B|>Ci, a block (immediately before a position where a track jump has occurred) is searched at the step S207 in accordance with the history time data B of the second resister. In fact, such search is repeated at steps S208 and S209 until a sub-code signal Q becomes equal to the history time data B. Once the sub-code signal Q becomes equal to the history time data B, it may be determined that the optical pickup has moved back to the above block (immediately before a position where a track jump occurred), so that the program goes to the step S205 for performing a normal reproducing operation.

Figure 4:
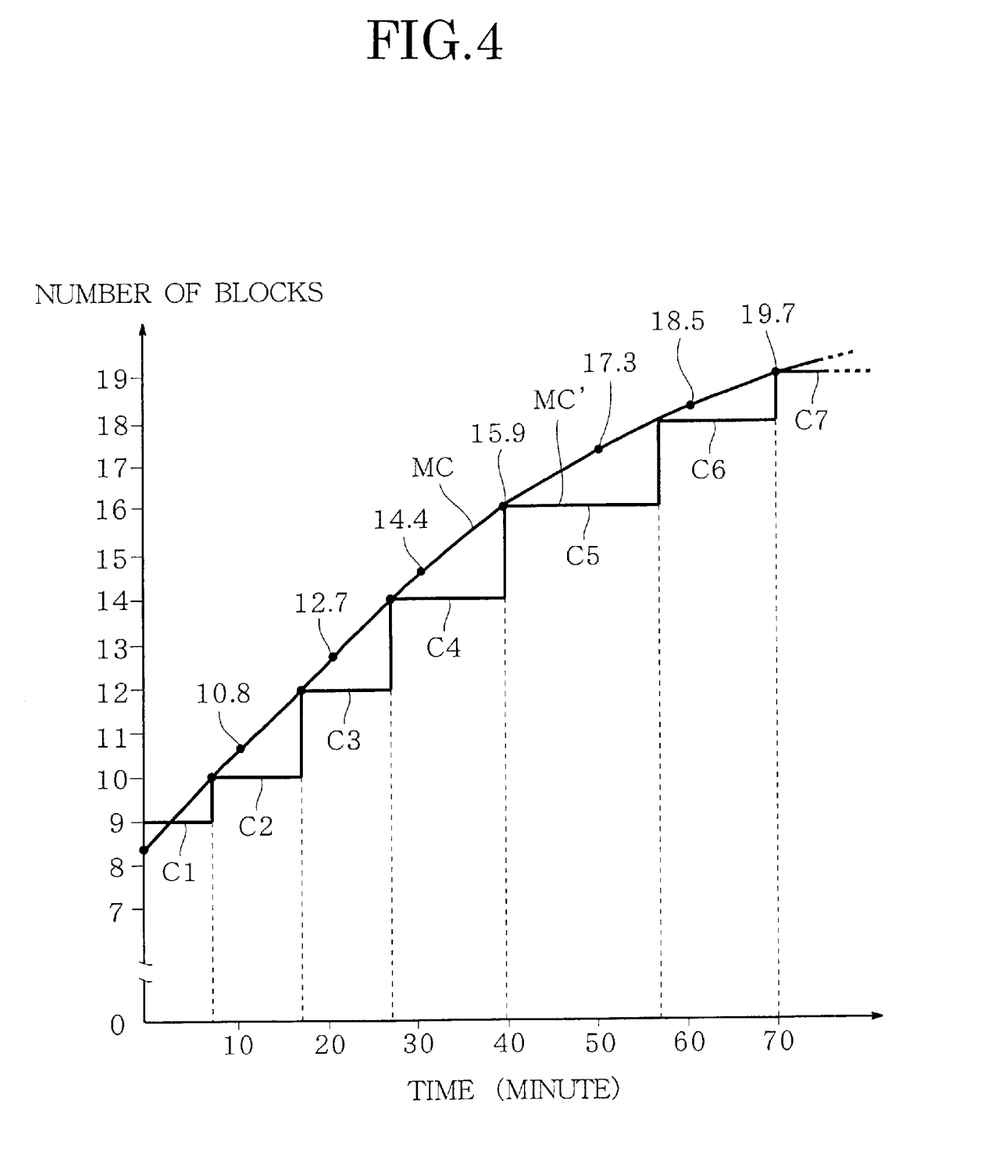
FIG. 4 is an explanatory graph indicating a principle for setting the above reference data.

Here, the reference data Ci of ROM 10 shown in FIG. 3 are set in accordance with a characteristic shown in FIG. 4. Referring to FIG. 4, a characteristic curve MC indicates that the closer the track is approaching the inner lead side, the fewer the blocks on said track will be. In other words, the closer the track is approaching the outer lead side, the more the blocks on said track will be.

In FIG. 4, the horizontal axis is used to represent address information (time information) of sub-code signal Q set in each block of the track, while the vertical axis is used to represent the number of blocks on one-turn track at a position corresponding to said time information.

Namely, as explained with reference to FIG. 5, although an optical pickup may properly perform a predetermined scanning for reading information recorded on the disc along an information track, since there may be existing defect block(s), it is necessary to establish a relationship between the number of defect blocks (when a mistaken determination has been made) and the number of blocks across which the optical pickup has jumped (jumping from one track to an adjacent track), so as to make use of such a relationship to calculate (in accordance with the characteristic curve MC) the correct number of blocks which can ensure an optimum condition allowing that true track jump may be exactly detected and that mistaken determination (detection) may be minimized.

Further, an address information (a time approximately equal to 0 minute) of the sub-code signal Q set in a block located in the innermost lead side is used as a reference (start point). Then, the blocks of one-turn track in positions corresponding to 10 minutes, 20 minutes, 30 minutes, 40 minutes, 50 minutes, 60 minutes and 70 minutes are connected so as to obtain the characteristic curve MC. In FIG. 4, values "10.8", "12.7", "14.4", "15.9", "17.3", "18.5", "19.7" are used to represent the number of blocks at each 10-minute interval.

Referring to FIG. 4, if a reference data Ci is set at an area above the characteristic curve MC, although it is allowed to reduce a possibility of causing a mistaken determination (indicating a non-existing track jump), there is an increased possibility that an actually occurred track jump will be overlooked. On the other hand, if a reference data Ci is set at an area below the characteristic curve MC, a possibility of causing a mistaken determination (indicating a non-existing track jump) will be increased, but a possibility of overlooking an actually occurred track jump will be reduced.

Thus, in order to read information at a high speed and to alleviate a burden on the compensation treatment of the central controller 8, it is preferred that reference data Ci be set in accordance with a step-like characteristic curve MC', in a manner as shown in FIG. 4.

In this way, when a determination (for detecting if there has been a track jump) at the step S203 (FIG. 2) is to be executed, a reference data Ci is set at a relatively smaller value at the time a track on the inner lead side is being scanned. On the other hand, a reference data Ci is set at a relatively larger value at the time a track on the outer lead side is being scanned. In this way, as compared with the above prior art in which the determination for detecting whether or not there has been a track jump is carried out in accordance with a fixed time $T_{HD}$, the present invention makes it more exactly to reduce the possibility of causing a mistaken determination, and makes it sure to more exactly determine (detect) an actually happened track jump.

In other words, a track closer to the inner lead side contains a relatively small amount of information, while a track closer to the outer lead side contains a relatively large amount of information, For this reason, by making larger a reference data Ci when scanning a track containing a larger amount of information, it is sure to more exactly reduce a possibility of causing a mistaken determination, and more exactly to determine (detect) an actually happened track jump.

As may be understood from the above description, when an optical scanning is in process to read information recorded in the tracks of a circular disc-like recording medium, if a difference between a present reproducing positional information and a reference (standard) reproducing positional information is larger than a predetermined value, it is allowed to determine that there has occurred a track jump. Here, said predetermined value is set to be a value corresponding to a present track position which is just being reproduced. Therefore, when a normal scanning process is in process for reading information recorded on the tracks of a circular disc-like recording medium, there would be no mistaken determination indicating a false and non-existing track jump. Meanwhile, it has become more exact to determine (detect) a true track jump when it has been actually occurred. As a result, it is sure to improve an information reproducing precision when reading information recorded on a recording medium.

While the presently preferred embodiments of this invention have been shown and described above, it is to be understood that these disclosures are for the purpose of illustration and that various changes and modifications may be made without departing from the scope of the invention as set forth in the appended claims.

What is claimed is:

1. A disc reproducing apparatus adapted to scan information tracks to read information recorded on an information recording medium, said disc reproducing apparatus comprising:

determining means for determining a track jump, said determining being effected when a difference between a present reproducing positional information and a reference reproducing positional information is larger than a predetermined value;

detecting means for detecting a present track position which is just being reproduced at a present time; and setting means for setting said predetermined value corresponding to the present track position, in accordance with a result of the detecting means.

2. A disc reproducing apparatus according to claim 1, wherein the larger the information amount contained in a track which is scanned, the larger said predetermined value is set to be.

3. A disc reproducing apparatus according to claim 1, wherein once the determining means determines that a track jump has happened, a scanning and reading operation is re-started from a track position corresponding to the reference reproducing positional information.

4. A disc reproducing apparatus according to claim 1, wherein the present reproducing positional information is address information.

5. A disc reproducing apparatus according to claim 4, wherein the present track position is detected according to the present reproducing positional information.

6. A disc reproducing apparatus according to claim 4, wherein the reference reproducing positional information is the address information.

7. A disc reproducing apparatus according to claim 5, wherein the reference reproducing positional information is the address information.

8. A method of reproducing a disc in a disc reproducing apparatus adapted to scan information tracks to read information recorded in an information-recording medium, comprising the steps of:

a) storing present reproducing positional information in a first register;

b) loading a predetermined value in a second register;

c) loading reference reproducing positional information in a third register;

d) determining an occurrence of a track jump when a difference between said present reproducing positional information in said first register and said reference reproducing positional information in said third register is greater than said predetermined value in said second register;

e) detecting a present information track position; and f) setting said predetermined value in accordance with the present information track position detected.

9. The method of claim 8, further comprising the steps of:

returning to a position defined by the reference reproducing positional information;

continuing to reproduce said information-recording medium from the position defined by the reference reproducing positional information.

10. The method of claim 8, wherein the information recording medium includes tracks having an inner lead side and an outer lead side, and a track positioned at the outer lead side stores more information than that positioned at the inner lead side, and wherein said predetermined value at the outer lead side is larger than that at the inner lead side.

11. The method of claim 8 further comprising the steps of determining no occurrence of the track jump when a difference between said present reproducing positional information in said first register and said reference reproducing positional information in said third register is less than said predetermined value in said second register; and forwarding said present reproducing positional information, as a new reference reproducing positional information, from said first register into said third register.

* * * * *